Patented Dec. 11, 1928.

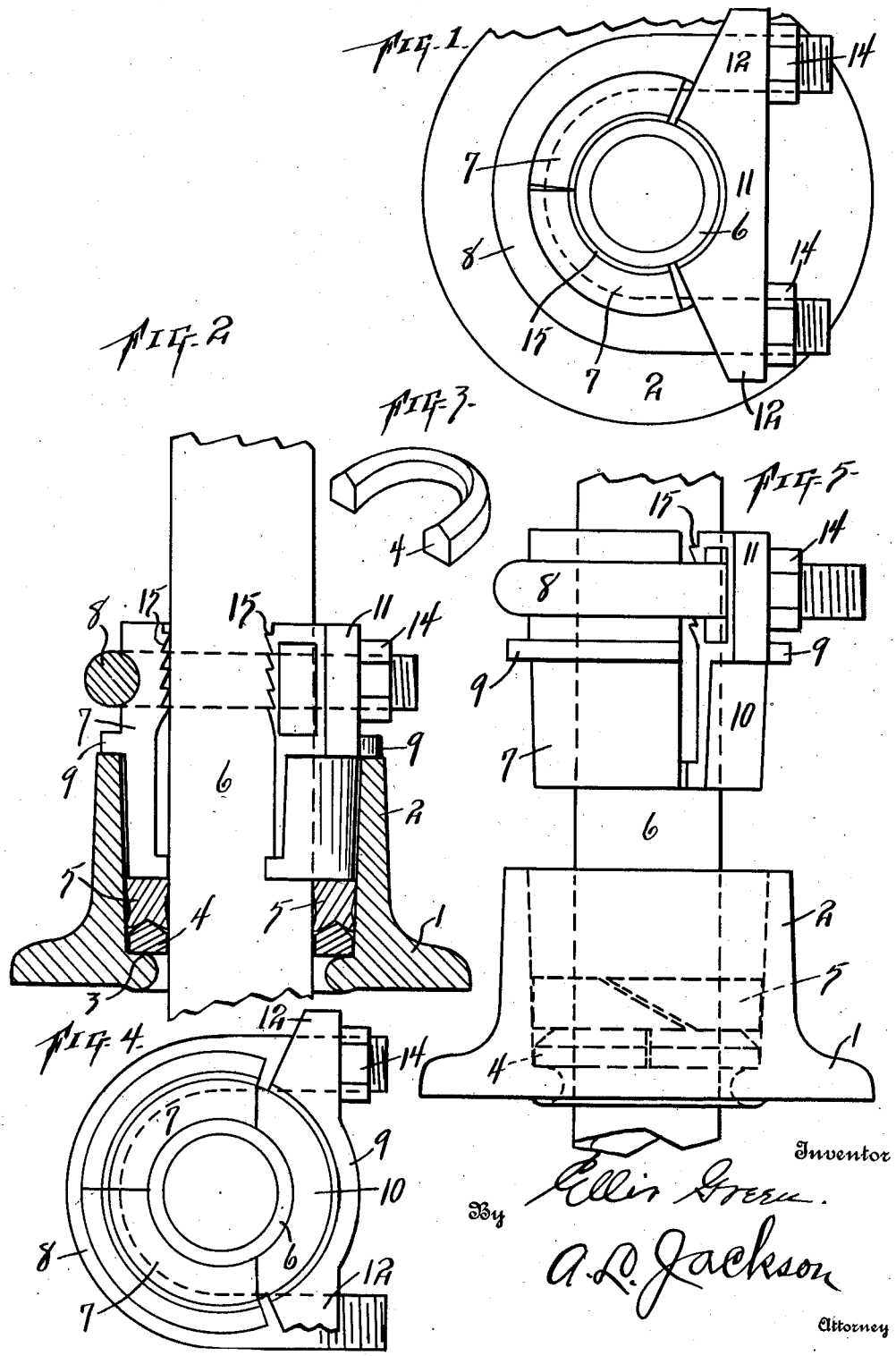

1,695,093

UNITED STATES PATENT OFFICE.

ELLIS GREEN, OF TULSA, OKLAHOMA, ASSIGNOR OF ONE-HALF TO L. A. GREEN, OF TULSA, OKLAHOMA.

TUBING SUPPORT.

Application filed June 24, 1926. Serial No. 118,329.

My invention relates to a tubing ring and stuffing box therefor and support for tubing; and the object is to provide a practical support for the tubing and also to provide a stuffing box to retain the gas or oil for preventing waste of oil and gas. One of the advantages of this invention is that the slips heretofore in use cannot be used to form packing glands and my invention overcomes this difficulty by making combined slips and packing gland so that the slips may be used to form a packing gland and another object is to provide means for preventing the slips from falling from the well tubing. In other forms of slips, the slips will fall off of the tubing when the tubing is raised. I have provided means for holding the slips on the tubing. Other objects and advantages will be fully explained in the following description and the invention will be more particularly pointed out in the claims.

Reference is had to the accompanying drawings which form a part of this application.

Fig. 1 is a plan view, showing the improved slips applied to a tubing.

Fig. 2 is a side elevation of a tubing with one of the slips omitted.

Fig. 3 is a perspective view of one of the members of a spreading ring.

Fig. 4 is a bottom plan view of the packing gland and the improved slip for use on tubing.

Fig. 5 is a side elevation of a tubing, showing the combination tubing ring and stuffing box, and showing the improved slips ready to be forced down onto the packing in the tubing ring.

Similar characters of reference are used to indicate the same parts throughout the several views.

The drawings show the various parts of the invention. Instead of the tubing ring heretofore in use, I have provided a combined tubing ring 1 and stuffing box 2 to be used with the improved method of spreading the packing on the underside of the packing. The tubing ring 1 has the usual annular interior shoulder 3 to support the spreading ring 4 which is V-shaped on the upper side. A packing ring 5 of rubber or other packing means, such as asbestos, hemp, or rags is placed on the spreading ring 4. When the slips come down on the packing 5, it will be spread on the underside both radially inward against the tubing 6 and radially outward against the stuffing box 2. The advantage of spreading on the underside of the packing is that the more pressure that comes on the packing from the force of the gas or fluid from below the packing, the tighter will be the packing against the stuffing box and against the tubing.

I have provided a departure in the slips used. The slips are tapered, as slips usually are, but the taper is for an entirely different purpose. The stuffing box 2 is larger in diameter at the upper end so that the packing ring 5 may be easily inserted. The slips are let down on the packing 5 and forced downwardly. The packing 5 will be reduced inwardly by the compression by the tapering wall of the stuffing box and thus make the packing tighter as it is forced downwardly by the slips. There are several slips and the number of slips may be varied. I show two slips 7 of the common type except that they have an annular exterior groove in the periphery thereof for a U-bolt 8 and they have an annular exterior rib 9 for resting on the top edge of the stuffing box 2 and supporting the immense weight on the stuffing box 2 instead of supporting the entire weight on the packing 5. The other member 10 of the slips has provision for carrying a yoke 11. The yoke 11 has laterally projecting ears 12 and the object of the ears 12 is to make provision for using the U-bolt 8 to clamp the slips rigidly together. The U-bolt 8 occupies the groove in the periphery of the slip members 7 and the ends of the U-bolt project through the ears 12 and nuts 14. The slips 7, 7, and 10 have teeth 15 similar to other slips. The bottoms of the slips take the place of a compression ring for compressing the packing 5. The U-bolts 8 will make the slips engage the tubing rigidly so that knocking or pounding on the slips to make them engage the tubing is dispensed with. The slips are not tightened or wedged in stuffing boxes as in spiders or tubing supports of a different type. In my form of slips, the slips cannot fall off when the tubing is lifted or forced upwardly by gas pressure but will remain on the pipe or tubing and go back in place, and not fall off as in other forms of slips. The slips herein set forth may be used for other purposes, such as clamping and moving pipe without the use of the packing or stuffing box, and for moving other devices of a size approaching the size of pipes.

It is apparent that the several parts may be of different sizes, proportions, construction, and arrangement without departing from my invention.

Much machine work is eliminated in the manufacture of the improved slips or tubing supports.

What I claim, is:—

1. A tubing support comprising a combined tubing ring and stuffing box, a spreader supported in said ring and provided with a V-shaped upper side, a packing ring mounted on said spreader, slips mounted on a well tubing and provided with a peripheral rib adapted to rest on the upper edge of said stuffing box and said slips being adapted to engage said packing ring to force the same down on said spreader for sealing purposes, and means for binding said slips on said tubing.

2. A tubing support comprising a combined tubing ring and stuffing box, slips mounted on a well tubing and provided with means for supporting the slips on said stuffing box, one of said slips having an integral yoke, and the other slips having a peripheral groove, and a U-bolt mounted in said groove and projected through said yoke and nuts for engaging the ends of the U-bolt for binding said slips on said tubing.

3. A tubing support comprising a combined tubing ring and stuffing box, sealing means mounted in said stuffing box, slips mounted on said stuffing box and projected down into said stuffing box for actuating said sealing means, one of said slips having laterally projecting perforated lugs and the other slips having a peripheral groove, a U-bolt mounted in said groove and projected through said lugs, and nuts engaging the ends of said U-bolt for binding said slips on a well tubing.

4. In a tubing support; slips for supporting a tube comprising slips having the usual interior teeth for engaging a tube, one slip having a groove about its periphery and the other slip having an exterior yoke, a U-bolt mounted in said groove and having its arms projecting through said yoke, and nuts for clamping said slips on said tubing.

5. Slips for supporting a well tube comprising slips having the usual interior teeth for engaging the tube, one slip having a groove in its periphery and the other slip having an integral yoke and ears projecting from said yoke, a U-bolt mounted in said groove and having arms projecting through said ears, and nuts for engaging said arms to clamp said slips on the tube.

6. Slips for supporting a well tube comprising slips having the usual interior teeth for engaging the tube, one slip having a groove in its periphery and the other slip having an integral yoke and ears projecting from said yoke, a U-bolt mounted in said groove and having threaded arms projecting through said ears, nuts engaging said arms for clamping said slips on the well tube, and exterior ribs integral with said slips for supporting the same.

In testimony whereof, I set my hand, this 29th day of May, 1926.

ELLIS GREEN.